July 6, 1937.  J. R. McCOY  2,085,920
DEVICE FOR INDICATING LUBRICATION FOR AN AUTOMOBILE
Filed May 9, 1934  2 Sheets-Sheet 1
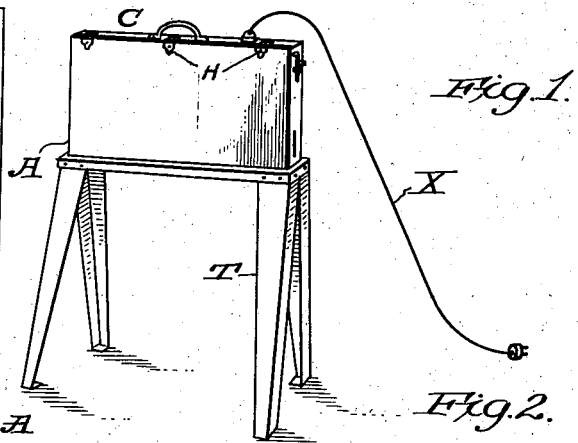
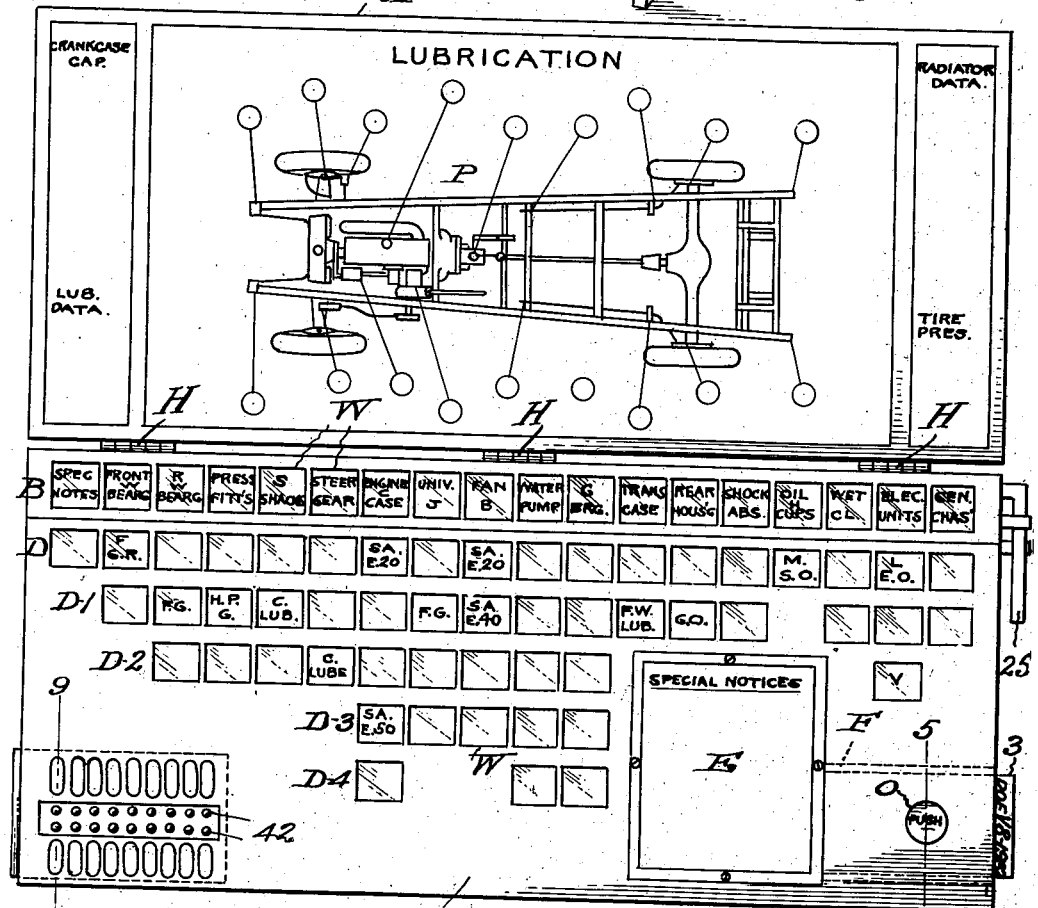
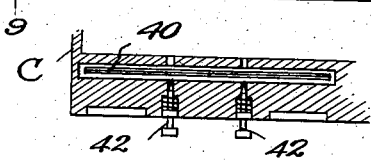
INVENTOR.
James R. McCoy,
BY Geo. A. Byrne.
ATTORNEY.

July 6, 1937.  J. R. McCOY  2,085,920
DEVICE FOR INDICATING LUBRICATION FOR AN AUTOMOBILE
Filed May 9, 1934  2 Sheets-Sheet 2
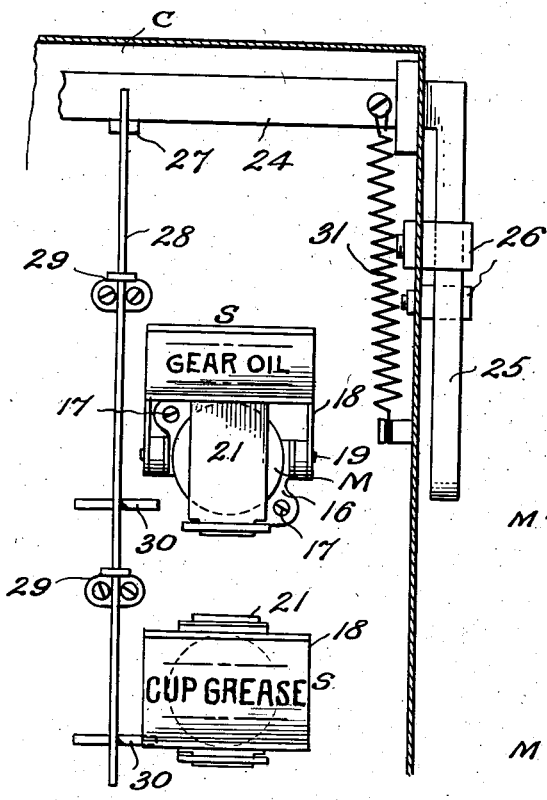
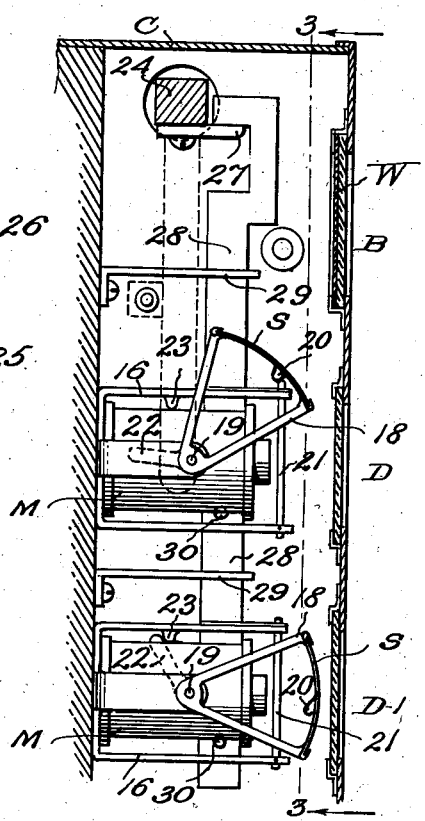
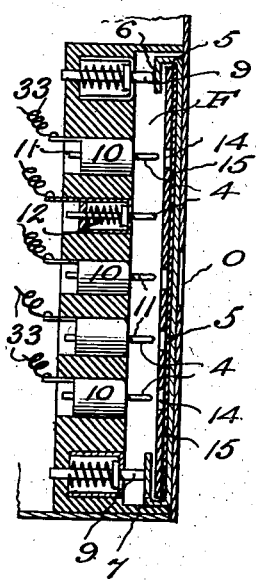
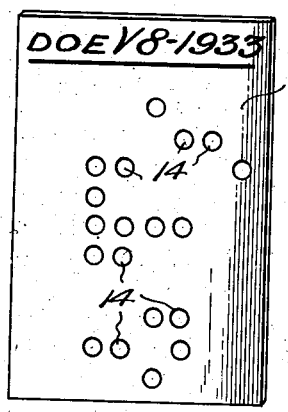
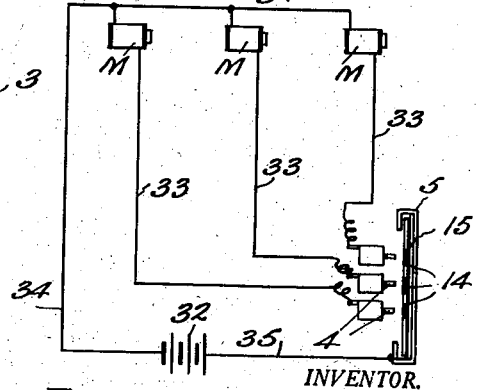
INVENTOR.
James R. McCoy,
BY Geo. A. Byrne
ATTORNEY Patented July 6, 1937

2,085,920

UNITED STATES PATENT OFFICE 2,085,920

DEVICE FOR INDICATING LUBRICATION FOR AN AUTOMOBILE

James Reynolds McCoy, Jersey City, N. J., assignor of one-fourth to Geo. A. Byrne, Brooklyn, N. Y.

Application May 9, 1934, Serial No. 724,743

12 Claims. (Cl. 35—54)

The present invention relates to a device for indicating lubrication for an automobile.

It is well known that the various standard makes of automobiles require special types of lubrication for each particular part thereof. In practice, the service operator at the garage must consult the catalogs or instruction books of the automobile manufacturer, or some other reference book, in order to ascertain the correct lubrication for any given part of the automobile which is to be lubricated. Ordinarily the service man relies on his memory, or some times only guesses at what type of lubrication should be used. As a result, the automobile is given improper lubrication and, consequently, parts wear out, fail in service, or the like. Various proposals have been made to overcome the disadvantages of the present system of lubricating automobiles, but as far as I am aware, the attempts have been unsuccessful for one reason or another.

It is an object of the present invention to provide a device which overcomes the disadvantages of prior systems of indicating lubrication to be used for an automobile and to provide a device which is practically foolproof.

It is another object of the invention to provide a device which will indicate electrically the exact and correct type of lubrication to be used.

It is a further object to provide a device which is capable of indicating the correct type of lubrication to be used for the principal or all parts of practically all of the standard makes of automobiles.

It is also within the contemplation of the invention to provide a device which is capable of being mounted at a garage or service station at a convenient and visible point so as to indicate electrically the lubrication to be used for any given automobile of standard make.

Summarily stated, the principal object of the invention is to provide a device for indicating the proper manner for lubricating the different types of automobiles, which comprises a chart of fixed and movable units serving as a guide for indicating the various parts of an automobile to be lubricated and the particular lubricants therefor, in conjunction with selective matrices corresponding to the prescribed lubricating systems of the respective cars, said matrices being capable of selectively controlling the closing of electrical circuits for actuating the movable units of the chart, which may be easily followed by the workmen at the garage or service station and without requiring any knowledge on their part respecting the particular lubricants to be used.

Other objects and advantages of the invention will become apparent from the following description taken in conjunction with the drawings in which:

Figure 1 is a perspective view of an embodiment of the invention.

Fig. 2 is a front elevational view of the casing removed from the stand and with the cover shown in its open position.

Fig. 3 is an enlarged detail vertical sectional view of a portion of the casing on the line 3—3 of Fig. 4.

Fig. 4 is a sectional view taken at right angle to Figure 3.

Fig. 5 is a detail vertical sectional view of a portion of the casing on the line 5—5 of Figure 2.

Fig. 6 is a perspective view of one of the matrix or control cards for selectively controlling the actuation of the shutters of the electro-magnets.

Fig. 7 is a diagrammatic view of the electrical circuit.

Fig. 8 is a perspective view of one of the receipt blanks indicating the parts lubricated on an automobile, and Fig. 9 is a detail sectional view on the line 9—9 of Figure 2.

Referring more particularly to Fig. 1, the reference character C designates the casing or housing of some suitable material which is mounted on a stand T so that the device may be conveniently placed in position in a garage, service station, or the like, and connected by the cable X to an electrical outlet. The front of the casing is closed by a cover A which is hinged to the top of the casing at H so that it may be thrown upwardly and held in its open position, as shown in Figure 2, by any suitable means. Behind the cover, the face of the casing is provided with a plurality of glass windows W. Upon each window of the top row B, a legend is placed which indicates the part of the automobile to be lubricated. Reading from left to right on Figure 2, with the exception of the first window in row B, which is left for special notices, the legends placed on the windows are, front wheel bearings, rear wheel bearings, pressure fittings, spring shackles, steering gear, engine crank case, universal joints, fan bearing, water pump, clutch bearings, transmission case, rear housing, shock absorbers, oil holes, cups, wet clutch, electrical units, and general chassis. Of course, as many windows can be employed in the new device as is desirable, but it is preferred merely to employ the principal parts of an automobile.

In alignment with the top row of windows B, are a plurality of rows of windows D, D—1, D—2, D—3 and D—4. Behind each of these windows is arranged to appear the name of the correct type of lubricant to be used when the device is actuated. For instance, some types of steering gears require a gear oil, while others require a grease. Similarly, for the other parts of an automobile, certain lubricants are required for particular parts of certain standard gears. For assisting the operator at the garage or service station, a picture P, of an automobile is shown on the inner side of the cover A. This picture depicts a chassis of an automobile with legends directed to important parts of the gear which must be lubricated. By using the picture in conjunction with the legends appearing on the front of the casing, the work of an operator in lubricating an automobile at a service station or a garage, is clearly facilitated. To further assist the operator in servicing various makes of automobiles, other data, such as, crank case capacities, lubrication data, radiator data and tire pressures, may be placed on the inner side of the cover adjacent to the side ends thereof. A space E for special notices is also provided on the front of the casing A.

Within the lower right hand corner of the casing C, a control box F is positioned for controlling the actuation of electro-magnets M, which are mounted behind the windows of the rows D, D—1, D—2, D—3 and D—4.

The electro-magnets, (see Figures 3 and 4) are provided with shutters S, on the face of which are affixed legends designating the particular lubricants. A control card or matrix 3, which is illustrated in Figure 6, is made of some insulating material such as cardboard, bakelite, rubber, or the like. This control card has the name of the automobile, as well as its type and model, noted thereon. Thus, on the card shown, there is a notation at the top of the card to denote that the control card is for the automobile name "Doe", the type "V8" and the model "1933." The operator consequently can select the card which corresponds to the automobile which is to be lubricated. By placing the card 3, in the control box F, the proper electro-magnets are actuated and the shutters drop behind the windows of the rows D, D—1, D—2, D—3, D—4.

A detail construction of the control box F is shown in Fig. 5. The body of the box is preferably made of an insulating material such as bakelite, hard rubber, and the like. Incorporated in the back of the box F, are a plurality of electrical contact plugs 4. The front of the box is closed by a slide 5, which has its inner upper edge 6, turned downward, and its inner lower edge 7, turned upward to provide a mounting for the control card 3. The slide 5 is held in its outer position by means of spring actuated plugs 9, mounted in the back of the box F, and engaging the back of the slide. As one skilled in the art will readily understand, control card 3 is arranged to permit cooperation with proper electrical contact plugs 4 when the slide is pushed to its inner position, so that only proper or selective electrical circuits will be established as will be explained hereinafter.

The electric plugs are made of a housing 10, within which a sliding contact 11 is positioned. A spring 12 is mounted in the rear of the housing 10 and tends to press contact 11 towards the front of the box.

As may be seen from Fig. 5, the front of the casing is provided with an opening O, through which an operator may insert his finger for pushing the slide 5 inwardly. When the slide is operated, some of the sliding contacts 4 engage the surface of the matrix or control card 3, whereas other contacts pass through perforations 14 and make contact with the metal plate 15, secured to the inner side of the slide. These contacts which engage with plate 15, complete a circuit to an electrical device preferably an electro-magnet M, which is mounted within the casing C. When pressure on the slide is released it returns to its original position thereby breaking the circuit causing the magnets to be deenergized.

As shown in Figs. 3 and 4, each magnet is mounted in a frame 16, and secured to the casing by screws 17. A movable shutter 18, is pivotally connected as at 19, to the opposite sides of the frame and is arranged to drop in front of the magnet when a circuit is completed. The shutter 18, is held in its upper position by means of a lug 20, mounted on the inner face of the shutter and engaging the upper edge of the armature 21, which is pivotally connected at its lower end, to the lower portion of the frame 16. When the armature is energized by the magnet, its upper end is swung inwardly and away from the lug 20, thus permitting the shutter 18, to drop to its lower position. The downward movement of the shutter is limited by means of a projection 22, secured to the inner end of the shutter engaging a lug 23, mounted on the frame 16. As shown on Fig. 3, the face of the shutters is provided with legends designating the lubricants, gear oil and cup grease. After the shutters have been actuated, any suitable means may be employed for returning them to their upper position. A resetting mechanism is herein shown in the form of a movable cross bar 24, mounted within the upper side ends of the casing. One end of the bar extends through the casing and is projected downwardly to provide a handle 25. Lugs 26, are secured to the casing on each side of the handle to limit its movement. The underside of the cross bar 24, is provided with a projection 27, which is arranged to engage the upper end of a vertical resetting bar 28, which is movably mounted in brackets 29, secured to the back of the casing. Outwardly projecting pins 30, are mounted in the side of the bar 28, and arranged to engage the side of the shutters 18, when in their lower position, and return them to their upper position when the resetting mechanism is actuated. It is to be understood that there is a resetting bar 28, located between each pair of rows of electro-magnets. In operating the resetting mechanism, the operator takes hold of the handle 25, and pulls it forward, which turns the bar 24 and causes the projection 27, to move the resetting bar 28, upwardly. In moving upward, the pins 30, on bar 28, engage the shutters that have dropped and return them to their upper position. In returning to their upper position the lug 20 on the shutters engages and escapes behind the upper edge of the armature 21, which has been tilted, so that when the resetting mechanism is released, the shutters will move slightly forward and return the tilted armature to its erect position. A spring 31 (see Fig. 3), having one end secured to the bar 24, and its other end secured to a wall of the casing, returns the resetting mechanism to its normal position.

From the foregoing (note Figures 4, 5, and 7), it will be observed that the electric circuit includes sliding contacts 4, plate 15, wire connections 33, electro-magnet M, wire connection 34, a source of current 32, and a return circuit to the contact plate 15. As those skilled in the art will readily understand, the matrix or control card 3, when placed in the control box F, will permit only the proper shutters S, to drop behind the proper windows in rows D, D—1, D—2, D—3, and D—4. The service man or operator can then clearly see which parts of the automobile are to be lubricated and exactly what type of lubricant is to be employed.

For the purpose of giving those skilled in the art a better understanding of the electrical connections, a diagrammatic electric circuit is illustrated in Fig. 7. In this figure, control card or matrix 3, is shown with a plurality of holes or perforations 14, incorporated therein, to permit sliding contacts 4, to engage contact plate 15. A circuit is thus established, including wires 33, electromagnets M, wire 34, a source of current 32, and a wire 35, to contact plate 15.

It is clear those shutters are actuated which are controlled by perforations 14, in the control card or matrix. The dropping of the shutters behind the windows provides a fool-proof indicating system for the information of the garage operator or service man who is lubricating the automobile under consideration. By having suitable control cards, a garage or service station is in a position to give reliable lubrication service to all standard makes of automobiles. Those skilled in the art will appreciate the importance of this feature and its value in selling reliable and dependable lubricating service to the public generally.

For the purpose of giving the customer or automobile owner whose automobile is to be lubricated, an accurate record of what was done on his car, a system of receipt cards is provided to be used in conjunction with the device described hereinabove. These cards are shown in Fig. 8. The reference character 40 designates the original of the card. As will be seen, the card has a place for the name of the customer as well as the name of the car, the date, the initials of the person lubricating the car and the parts of the car to be lubricated. It is preferred to have card 40 in triplicate so that the customer may have the original card, the central office of the garage or the service station the duplicate card, and the attendant at the service station the triplicate card.

It is preferred to provide a punching device 41 which is mounted upon casing C so that card 40 can be punched to indicate the different parts of the automobile which have been lubricated. Thus, a plurality of punches 42 are provided in the punching device to correspond with the various parts of an automobile which has to be lubricated. By slipping the card in the punching device 41 and by operating the various punches 42, card 40 may be punched to indicate exactly what parts have been lubricated on the automobile under treatment. Of course, there is a legend beside each punch 42 so that the operator knows exactly what the punch in question means.

In Fig. 9 a sectional view of the punching device is shown. In this view it is clearly seen that punching device 41 is mounted on casing C and punches 42 may be operated to perforate or punch card 40 which is inserted in the punching device. By the use of this auxiliary device an accurate record is made of what parts were lubricated on the automobile.

While preferred embodiments of the invention have been described herein, it is to be understood that the invention is not limited to the precise construction and form of these embodiments, and that variations and modifications may be made without departing from the scope of the invention as defined in the appended claims.

I claim:—

1. A device for indicating the lubrication to be used on an automobile which comprises a plurality of continuously operative indicating units, each of said units denoting a part of an automobile to be lubricated, a plurality of intermittently operative indicating units, each of said units having an electrical circuit associated therewith and denoting the name of a lubricant, individual electrical contact means for each of said circuits capable of cooperating with a contact means in common for said circuits and of actuating said intermittently operative indicating units, and a control card having perforations in accordance with the lubrication requirements of a type of an automobile adapted to be interposed between a group of said individual contact means and said common contact means and to prevent actuation of said contacts and of the indicating units associated therewith.

2. An apparatus for indicating the lubricants to be used on parts to be lubricated of automobiles comprising a plurality of continuously operative indicating units denoting the parts of an automobile to be lubricated, a plurality of electrically energized indicating units associated with the aforesaid units denoting the lubricants to be used for said parts, a system of electrical circuits associated with said indicating units, a source of current for said circuits, a contact for each of said circuits, and a selective matrix having insulating and non-insulating areas arranged to co-operate with said contacts and adapted to prevent actuation of a selective number of said contacts engaged by said insulating areas and of the circuits associated therewith.

3. A device for electrically indicating the lubrication to be used on an automobile which comprises a casing, a plurality of indicating units mounted therein, said indicating units including a fixed set to indicate the parts of an automobile to be lubricated and a movable set adapted to be moved from an invisible to a visible position by electric action to indicate what lubricant is to be used on the said parts, an electrical control means including contacts for each of said electrically actuated indicating means, and a control card mounted in said control means having insulating and non-insulating areas in accordance with the lubrication requirements of a type of an automobile adapted to prevent actuation of the contacts engaging said insulating areas and of the indicating means associated therewith.

4. A device for electrically indicating the lubrication to be used on an automobile which comprises a casing, a plurality of electrical indicating units comprising electrically operable shutters mounted in said casing, each of said shutters bearing the name of a lubricant on its face and being adapted to be moved from an invisible to a visible position, an electrical circuit associated with each of said indicating units, an electrical control means including a contact for each of said circuits, and a control card of an insulating character having perforations in accordance with the lubrication requirements of a type of automobile mounted in said control means, said card being adapted to prevent actuation of a group of said contacts and to maintain the indicating units associated therewith in an inoperative condition.

5. A device for indicating the lubrication to be used on an automobile which comprises a casing, a plurality of indicating units mounted therein, said units comprising a fixed row for indicating the parts of the automobile to be lubricated and a plurality of rows of movable electrical indicating units each of said units being adapted for actuation to indicate a lubricant to be used, an electrical circuit and a contact means associated with each of said movable indicating units, a control box for housing said contact means, and a control card of an insulating character having perforations arranged in accordance with the lubrication requirements of a type of automobile mounted in said control box said card being adapted to prevent actuation of a group of said contacts and to maintain the indicating units associated therewith in an inoperative condition.

6. A device for indicating the lubrication to be used on an automobile which comprises a casing, a plurality of indicating units mounted therein and visible to an operator, said units comprising a row for indicating the parts of the automobile to be lubricated and a plurality of rows of movable electrical indicating units each of said units being adapted for actuation to indicate a lubricant to be used, an electrical circuit and a contact associated with each of said movable indicating units, a control box for housing said contacts, and a control card inserted in said control box having insulating and non-insulating areas arranged in accordance with the lubrication requirements of a type of an automobile, said card being adapted to prevent actuation of a group of said contacts engaging said insulating areas and to maintain the indicating units associated therewith in an inoperative condition.

7. A device for indicating the lubrication to be used on an automobile which comprises a casing, units mounted therein containing the names of parts to be lubricated, a plurality of windows through which the particular lubricant to be used may be noted for each part of the automobile, an electrically actuated shutter associated with each window, said shutter bearing the name of the lubricant to be used and adapted to show said name in said window when actuated, a control device including a contact for each of said shutters, and a control card of an insulating material having perforations therein corresponding to the lubrication requirements of a type of an automobile inserted in said control device, said card being adapted to prevent actuation of a group of said contacts and to maintain the shutters associated therewith in an inoperative position.

8. A device for indicating the lubrication to be used on an automobile which comprises a casing, units mounted therein containing the name of the parts to be lubricated, and a plurality of windows through which the particular lubricant to be used may be noted for each part of the automobile, an electrically actuated shutter associated with each window, said shutter bearing the name of a lubricant to be used and adapted to show said name in said window when actuated, a movable electrical contact for each of said shutters, a control device housing said electrical contacts, a control card having insulating and non-insulating areas arranged in accordance with the lubrication requirements of a type of an automobile inserted in said control device and engaged by said contacts, said card preventing actuation of the contacts engaging said insulating areas and of the shutters associated therewith.

9. A device for indicating the lubrication to be used on an automobile which comprises a casing, units mounted therein containing the names of the parts to be lubricated, a plurality of windows through which the particular lubricant to be used may be noted for each part of the automobile, an electrically actuated shutter associated with each window, said shutter bearing the name of a lubricant to be used and adapted to show said name in said window when actuated, a movable electrical contact for each of said shutters, a control device housing said electrical contacts, a control card having insulating and non-insulating areas arranged in accordance with the lubrication requirements of a type of an automobile inserted in said control device and engaged by said contacts, said card preventing actuation of the contacts engaging said insulating areas and of the shutters associated therewith, and means mounted on said casing for re-setting said shutters after actuation.

10. A device for indicating the lubrication to be used on an automobile which comprises a casing, a plurality of electrically energized movable indicating units mounted in said casing, each of said movable indicating units being adapted to show the name of a lubricant when energized and moved into an operative position, a control means including an electrical contact associated with each of said indicating units, and a control card having perforate and imperforate areas inserted in said control means and adapted to prevent actuation of a selected group of said contacts and of the indicating units associated therewith.

11. A device for indicating the lubrication to be used on an automobile which comprises a casing, a plurality of indicating units mounted in said casing, said indicating units including a fixed set to indicate the parts of an automobile to be lubricated, an electrically energized movable set to indicate the lubricant to be used on said parts, each of said movable indicating units being adapted to show the name of a lubricant when energized and moved into an operative position, a control means including an electrical contact associated with each of said movable indicating units, and a control card inserted in said control means and adapted to prevent actuation of a group of said contacts and of the indicating units associated therewith.

12. A device for indicating the lubrication to be used on an automobile which comprises a casing, a plurality of indicating units mounted in said casing, said indicating units including a fixed set to indicate the parts of an automobile to be lubricated, an electrically energized movable set to indicate the lubricant to be used on said parts, each of said movable indicating units being adapted to show the name of a lubricant when energized and moved into an operative position, a control means including an electrical contact associated with each of said movable indicating units, a control card inserted in said control means and adapted to prevent actuation of a group of said contacts and of the indicating units asssociated therewith, and means for resetting the indicating units after each operation.

JAMES REYNOLDS McCOY.